US012783121B2

(12) United States Patent
Tharanath et al.

(10) Patent No.: US 12,783,121 B2
(45) Date of Patent: Nov. 3, 2026

(54) REDUNDANT ARRAY PARITY INFORMATION STORAGE

(71) Applicant: Micron Technology, Inc., Boise, ID (US)

(72) Inventors: Pranav Tharanath, Bangalore (IN); Amiya Banerjee, Bangalore (IN); Sriraman Sridharan, Hosur (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/224,485

(22) Filed: May 30, 2025

(65) Prior Publication Data

US 2026/0003500 A1 Jan. 1, 2026

Related U.S. Application Data

(60) Provisional application No. 63/666,060, filed on Jun. 28, 2024.

(51) Int. Cl.
*G06F 3/06* (2006.01)

(52) U.S. Cl.
CPC .......... *G06F 3/0608* (2013.01); *G06F 3/0646* (2013.01); *G06F 3/0673* (2013.01)

(58) Field of Classification Search
CPC ..... G06F 3/0608; G06F 3/0646; G06F 3/0673
See application file for complete search history.

(56) References Cited

U.S. PATENT DOCUMENTS

| | | | | |
|---|---|---|---|---|
| 11,914,886 | B2 * | 2/2024 | Gorobets | G06F 3/0679 |
| 2017/0046221 | A1 * | 2/2017 | Bandic | G06F 11/1044 |
| 2017/0322843 | A1 * | 11/2017 | Hsu | G06F 3/0688 |
| 2021/0327529 | A1 * | 10/2021 | Moon | G11C 29/14 |
| 2022/0300374 | A1 * | 9/2022 | Yeung | G06F 11/1012 |
| 2023/0052161 | A1 * | 2/2023 | Seok | G06F 3/061 |
| 2025/0181450 | A1 * | 6/2025 | Park | G06F 11/1048 |

* cited by examiner

*Primary Examiner* — Edward J Dudek, Jr.
(74) *Attorney, Agent, or Firm* — Holland & Hart LLP

(57) ABSTRACT

Methods, systems, and devices for redundant array parity information storage are described. A memory system may store parity information associated with data in one or more latches associated with one or more planes before writing the data from the latches to the one or more planes. The parity information may be transferred from the latches to the one or more planes. The memory system may temporarily transfer the parity information from the latches to the planes before completing the write operation in response to initiating a write operation that uses more of the latches, and may transfer the parity information back to the latches after the write operation is completed. The memory system may store, retrieve, and transfer the parity information to or from the latches according to an interleaving scheme associated with different write operations of the memory system.

23 Claims, 8 Drawing Sheets

REDUNDANT ARRAY PARITY INFORMATION STORAGE

CROSS REFERENCE

The present application for patent claims priority to U.S. Patent Application No. 63/666,060 by Tharanath et al., entitled "REDUNDANT ARRAY PARITY INFORMATION STORAGE," filed Jun. 28, 2024, which is assigned to the assignee hereof, and which is expressly incorporated by reference in its entirety herein.

TECHNICAL FIELD

The following relates to one or more systems for memory, including redundant array parity information storage.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
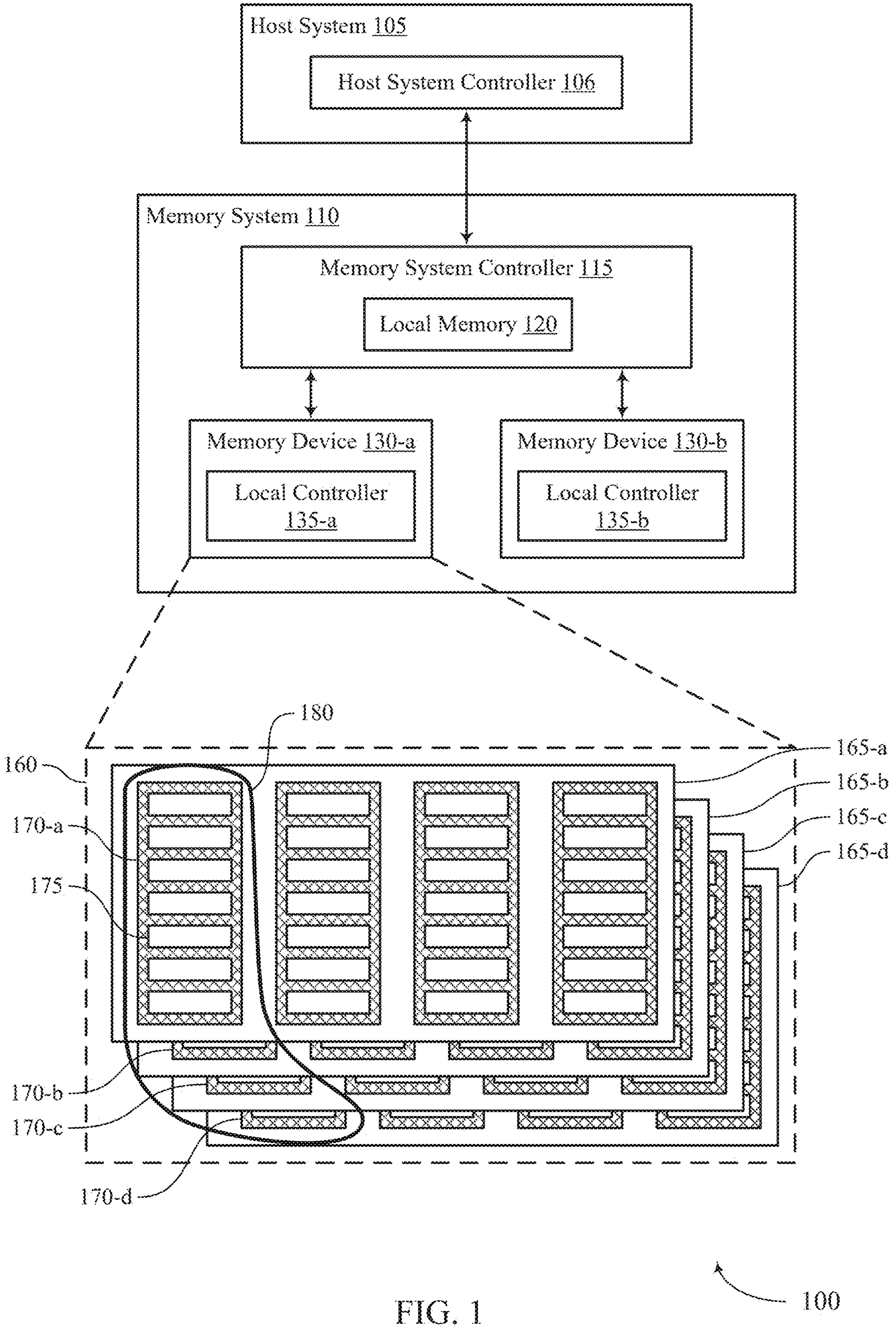
FIG. 1 shows an example of a system that supports redundant array parity information storage in accordance with examples as disclosed herein.

To store data to one or more planes of memory cells in a memory die of a memory system, the memory system may utilize a set of latches (e.g., data latches, data caches, primary data caches (PDCs), secondary data caches (SDCs)) for writing data to each plane. In some cases, the quantity of latches in each set of data latches may correspond to a highest write mode (e.g., a write mode associated with the largest quantity of bits per memory cell) supported by the memory system, and write operations associated with other write modes may not use each of the latches. Additionally, a memory system may implement one or more data protection schemes (e.g., a redundant array of independent NAND (RAIN) algorithm), which may include storing data across a plurality of memory dies (e.g., in memory arrays of the memory dies) and calculating parity information for the data. In some cases, the memory system may store the parity information in cache memory (e.g., random access memory (RAM), static RAM (SRAM), dynamic RAM (DRAM)) before writing the data to the planes, and may write (e.g., flush) the parity information to the planes after writing the data. However, storing the parity information in the cache memory may use a relatively large portion of the cache memory of the memory system, reducing an amount of cache memory available for other functions of the memory system.

According to techniques described herein, a memory system may store parity information associated with data in one or more unused latches associated with one or more planes before writing the data to the one or more planes (e.g., instead of storing the parity information in the cache memory). During a programming period of the one or more planes (e.g., from the latches), the parity information may be transferred (e.g., flushed) from the latches to the one or more planes. In some cases, the memory system may temporarily transfer the parity information from the latches to the planes before completing the write operation in response to initiating a write operation that uses more of the latches (e.g., a write operation at a higher level write mode, a higher level write operation), and may transfer the parity information back to the latches after the write operation is completed. In some cases, the storing, retrieving, and transferring of the parity information to or from the latches may occur according to an interleaving scheme within durations associated with different write operations of the memory system, which may reduce latency associated with such techniques. Accordingly, the memory system may use less cache memory for storing parity information, leaving more cache memory available for other useful operations.

In addition to applicability in memory systems as described herein, techniques for redundant array parity information storage may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by increasing usable cache storage (e.g., RAM, SRAM, DRAM) by storing parity information in latches associated with memory dies, which may improve computational capabilities and otherwise improve user experience, among other benefits.

Features of the disclosure are illustrated and described in the context of systems, devices, and circuits. Features of the disclosure are further illustrated and described in the context of memory systems, block diagrams, and flowcharts.

FIG. 1 shows an example of a system 100 that supports redundant array parity information storage in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). For example, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

According to techniques described herein, the memory system 110 may store parity information associated with data in one or more unused latches (e.g., as described herein with respect to FIG. 2) associated with one or more planes 165 before writing the data to the one or more planes 165 (e.g., instead of storing the parity information in cache memory, such as the local memory 120). During a programming period of the one or more planes 165 (e.g., from the latches), the parity information may be transferred (e.g., flushed) from the latches to the one or more planes 165. In some cases, the memory system 110 may temporarily transfer the parity information from the latches to the planes 165 before completing the write operation in response to initiating a write operation that uses more of the latches (e.g., a write operation at a higher level write mode, a higher level write operation), and may transfer the parity information back to the latches after the write operation is completed (e.g., as described herein with respect to FIG. 6). In some cases, the storing, retrieving, and transferring of the parity information to or from the latches may occur according to an interleaving scheme within durations (e.g., programming windows) associated with different write operations of the memory system, which may reduce latency associated with such techniques. Accordingly, the memory system may use less cache memory for storing parity information, leaving more cache memory available for other useful operations.

The system 100 may include any quantity of non-transitory computer readable media that support redundant array parity information storage. For example, the host system 105 (e.g., a host system controller 106), the memory system 110 (e.g., a memory system controller 115), or a memory device 130 (e.g., a local controller 135), or any combination thereof may include or otherwise may access one or more non-transitory computer readable media storing instructions (e.g., firmware, logic, code) for performing the functions ascribed herein to the host system 105, the memory system 110, or the memory device 130, or combination thereof. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
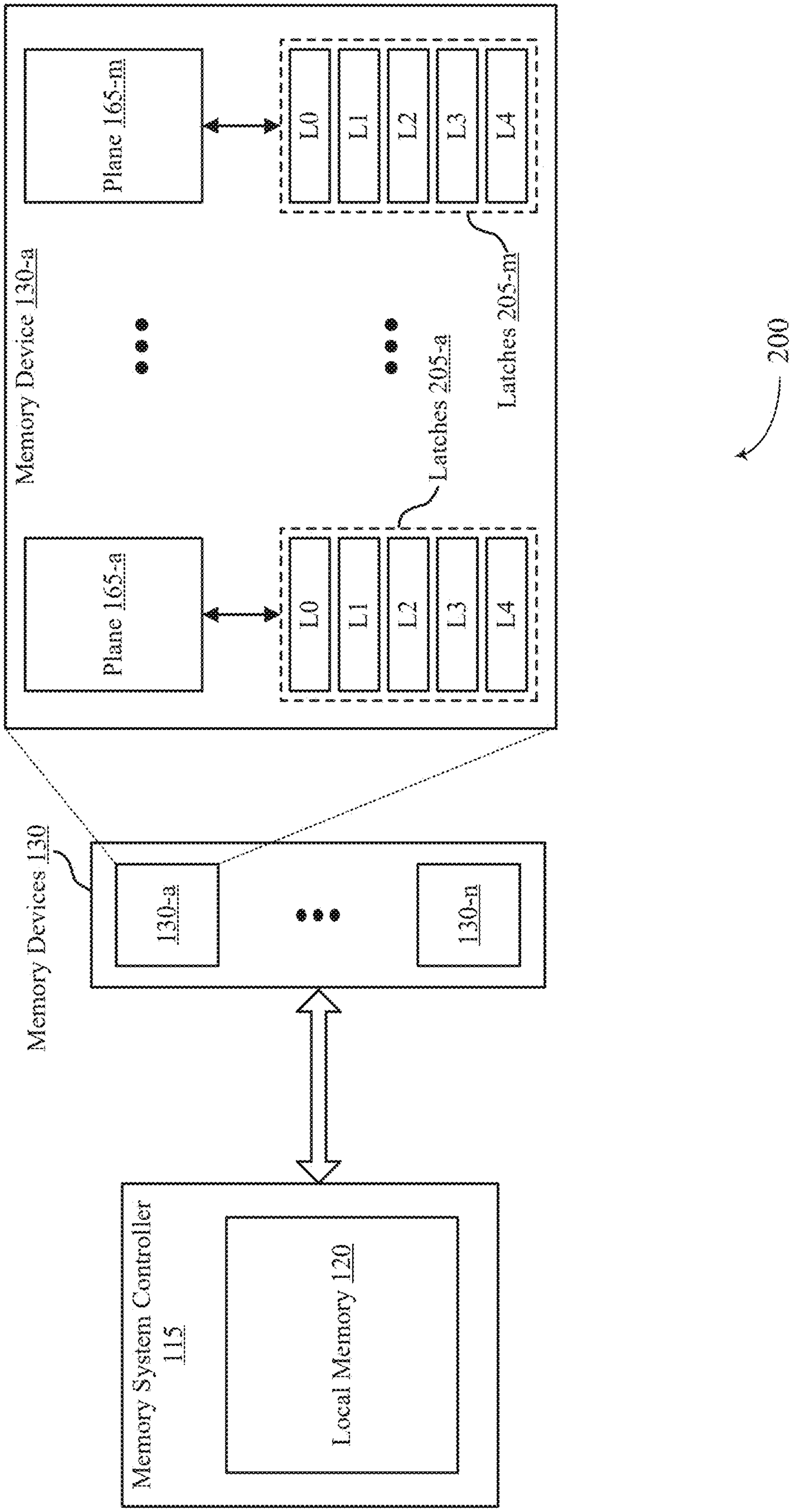
FIG. 2 shows an example of a memory system diagram that supports redundant array parity information storage in accordance with examples as disclosed herein.

FIG. 2 shows an example of a memory system 200 that supports redundant array parity information storage in accordance with examples as disclosed herein. In some cases, aspects of the memory system 200 may implement or be implemented by aspects of FIG. 1. For example, the memory system 200 may include a memory system controller 115, local memory 120 (e.g., cache memory, RAM, SRAM, DRAM), one or more memory devices 130 (e.g., a memory device 130-*a* through a memory device 130-*n*), and one or more planes 165 (e.g., a plane 165-*a* through plane 165-*m*), which may be examples of corresponding components described herein with respect to FIG. 1. Each plane 165 may additionally include one or more blocks of memory, which may be divided into sub-blocks and pages of data, (e.g., further described herein with respect to FIG. 3). Additionally, the memory system 200 may be an example of the memory system 110 as described herein with respect to FIG. 1. In some aspects, the memory system 200 may utilize latches 205 (e.g., data caches associated with a plane 165 of the memory device 130) to store parity information within a memory device 130 (e.g., a memory device 130-*a*), which may increase available space in the local memory 120 for performing other functions in the memory system 200.

Figure 3:
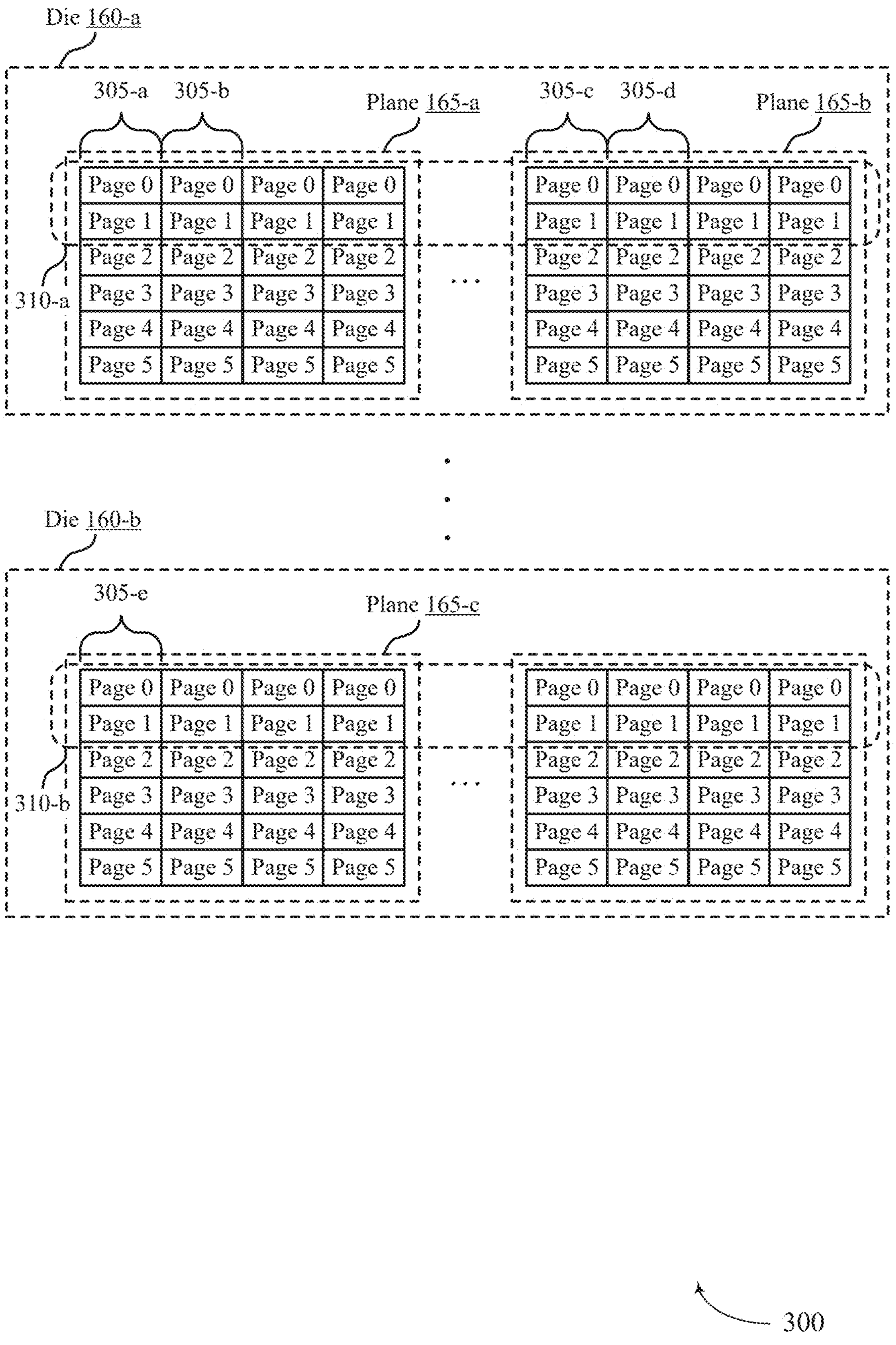
FIG. 3 shows an example of a block diagram that supports redundant array parity information storage in accordance with examples as disclosed herein.

In some cases, the memory system 200 (e.g., the memory system 110) may implement a RAIN algorithm for data protection within the memory devices 130 (e.g., further described herein with respect to FIG. 3). In some cases, implementing a RAIN algorithm may utilize a relatively large portion (e.g., allocation) of the local memory 120 (e.g., cache memory RAM, SRAM, DRAM) to store parity information associated with different write operations (e.g., active write operations, cursors) in different blocks of memory (e.g., a write booster cursor, an enhanced memory cursor, a host tri-level cell (TLC) block cursor, other cursors) of the memory device 130-*a*. For example, according to the RAIN algorithm, the memory system 200 may calculate parity information for each page of data within a plane 165 of the memory device 130-*a*, and the parity information for each page of data may utilize a quantity of memory (e.g., 16 kilobytes, KB) in the local memory 120. Thus, the portion of the local memory 120 utilized for a RAIN algorithm may scale with a quantity of pages per plane of the memory device 130.

Additionally, each plane 165 may include one or more blocks of one or more block types, where each block type may include different quantities of virtual pages per page. For example, different types of blocks may store different quantities of bits of data in each memory cell of the block, and a block that stores a higher quantity of bits per memory cell may store a higher quantity of virtual pages per page. For example, the memory system may include single-level cell (SLC) blocks, multi-level cell (MLC) blocks, TLC blocks, quad-level cell (QLC) blocks, or other types of cells (e.g., higher level cells). In an example of a TLC block, each page may include three virtual pages (e.g., an upper page, a lower page, and an extra page), where the RAIN algorithm may store parity information in the local memory for each virtual page of a plane 165 of the memory device 130-*a*. Thus, the portion of the local memory 120 utilized for a RAIN algorithm may scale with a quantity of virtual pages per plane of the memory device 130.

In some cases, blocks associated with relatively more levels (e.g., QLC blocks) may be called higher level blocks, and the memory system 200 may write data to higher level blocks using a higher level write mode (e.g., a QLC write mode) that stores higher quantities of bits per memory cell. Alternatively, blocks associated with relatively less levels (e.g., TLC blocks, SLC blocks) may be called lower level blocks, and the memory system 200 may write data to lower level blocks using a lower level write mode (e.g., TLC write mode, SLC write mode) that stores lower quantities of bits per memory cells (e.g., 2 bits, 1 bit, respectively).

In some cases, the memory system 200 may maintain the parity information for the information in the local memory 120 while writing the data to a die of the memory device 130 to recover data in the event of an error (e.g., according to the RAIN algorithm, as described herein with respect to FIG. 3). For example, if the data includes one or more errors (e.g., corrupted data), the memory system 200 may use the parity information associated with the data to recover the data. In some cases, the parity information may be capable of recovering a threshold quantity of pages of data (e.g., one page of corrupted data) within a group of pages (e.g., a word-line group as described herein with respect to FIG. 3, a quantity (two) of word-lines as described herein with respect to FIG. 3).

After the data is written to memory device 130-*a* (e.g., to one or more pages of one or more blocks of the one or more planes of the memory device 130-*a*, to a virtual block of the memory device 130-*a*, when the virtual block is closed), the memory system 200 may transfer the parity information for the data from the local memory 120 to one or more pages of the memory device 130-*a*. For example, the memory system 200 may write the parity information in a last quantity of pages of the planes 165 in the memory device 130-*a* (e.g., the quantity corresponding a block type of the planes 165).

Increasing an amount of memory in the local memory 120 may be relatively costly. Thus, to reduce costs of the memory system 200, techniques described herein may allow the memory system to reduce the amount of memory in the local memory 120 used to maintain the parity information. Accordingly, the memory system may use more of the local memory 120 (e.g., RAM, SRAM, DRAM) for other operations (e.g., other media architecture algorithms).

For example, according to techniques described herein, the memory system 200 may store (e.g., maintain) parity information in the latches 205 (e.g., internal latches of the memory device 130-*a*, page buffers, primary data caches (PDCs) and secondary data caches (SDCs) of the memory device 130-*a*) of the memory device 130-*a*. In some cases, the operations for storing (e.g., writing) the parity information to the latches 205 may be interleaved with programming operations for the planes 165 of the memory device 130-*a*, which may reduce or eliminate latency associated with storing the parity information within the latches 205.

In some cases, each plane 165 may correspond to a set of the latches 205. For example, a plane 165-*a* of the memory device 130-*a* may correspond to latches 205-*a*, and another plane 165-*m* may correspond to latches 205-*m*. Each plane 165 may correspond to a same quantity of the latches 205, where the quantity of the latches 205 may correspond to a highest level write mode that the memory system 200 supports. For example, if the memory system 200 supports QLC blocks, each plane 165 may correspond to five internal latches (e.g., L0-L4), where four of the latches 205 (e.g., L0-L3, PDCs) may be available for use during QLC programming operations to a corresponding plane 165, and one of the latches 205 latch (e.g., L4, SDC) may be reserved for transfer of data to the PDCs by the memory device 130-*a*. In some cases, each of the latches 205 may be capable of storing a quantity of data (e.g., a page of data, 16 KB).

In some cases, writing data to lower level blocks (e.g., TLC blocks, SLC blocks) in a memory system that supports higher level blocks (e.g., QLC blocks) may use a subset of the latches 205 for each plane 165, which may leave one or more of the latches 205 for each plane 165 unused. For example, performing a TLC write to a memory system 200 supporting QLC blocks may uses three of the latches 205 (e.g., L0-L2), and may leave one of the latches 205 (e.g., L3) unused. In general, the difference in levels between a lower level write mode and the highest write mode that the memory system 200 supports corresponds to a quantity of latches 205 that may be unused by the lower level write mode. Thus, the present disclosure may describe using latches 205 that are unused by lower level write operations to store parity information associated with the memory device 130-*a*, which may reduce memory usage of the local memory 120. Because each plane of the memory device 130-*a* may be associated with a set of the latches 205, an amount of parity information that may be saved in the latches 205 may correlate to a quantity of planes 165 per memory device 130 (e.g., planes per die of the memory device 130). For example, the more planes 165 that a memory device 130 has, the more unused latches may be available for storing parity information.

In some cases, the memory system 200 may not perform write operations according to the higher level write modes (e.g., QLC writes) as an initial write of host data to the memory device 130-*a*. Instead, initial writes may be according to a lower level write mode into lower level blocks (e.g., SLC or TLC), and the data from the lower level blocks may later be transferred (e.g., folded) into higher level blocks (e.g., QLC blocks) of the memory system for denser memory storage (e.g., according to a write booster mode). Thus, during lower level writes (e.g., caching host data into the latches 205), the memory system 200 may store the parity information into the latches 205 that are unused.

In some cases, the memory system 200 may switch to performing a higher level write (e.g., a QLC write) while parity information is stored in the latches 205. In such cases (e.g., as described herein with respect to FIG. 6), the memory system 200 may flush (e.g., transfer) the parity information from the latches 205 onto the planes 165. Then, if the memory system 200 switches back to performing lower level writes to the planes 165, the memory system 200 may read (e.g., re-load, sense) the parity information from the planes 165 into the latches 205. As described herein with respect to FIGS. 4-6, the techniques described herein may interleave the transfer of parity information to and from the latches 205 within a durations for programming the planes 165 (e.g., a programming window) or receiving data into the latches 205.

Although the memory system 200 includes a quantity of the latches 205 for each plane 165 (e.g., five latches per plane 165), the techniques described herein may anticipate any quantity of latches, supported write modes, block levels, or any other component of the memory system 200. For example, the disclosed techniques may be applied to handling TLC writes in QLC capable memory systems, SLC writes in TLC or QLC capable memory systems, or any other combination.

FIG. 3 shows an example of a block diagram 300 that supports redundant array parity information storage in accordance with examples as disclosed herein. In some cases, aspects of the block diagram 300 may implement or be implemented by aspects of FIGS. 1 and 2. For example, the block diagram 300 may illustrate one or more components in a memory device (e.g., the memory device 130), and may include one or more dies 160 (e.g., a die 160-*a*, a die 160-*b*), one or more planes 165 (e.g., a plane 165-*a*, a plane 165-*b*, a plane 165-*c*), one or more sub-blocks 305 (e.g., a column of pages in a plane 165, a sub-block 305-*a*, a sub-block 305-*b*, a sub-block 305-*c*, a sub-block 305-*d*, a sub-block 305-*e*) and one or more pages, each of which may be an example of corresponding components as described herein with respect to FIGS. 1 and 2. In some aspects, the block diagram 300 may illustrate a layout of one or more components within a memory device 130, and may illustrate steps of a RAIN algorithm, where redundant array parity information storage techniques described herein may reduce usage of a cache memory (e.g., RAM, SRAM, DRAM, the local memory 120, as described herein with respect to FIG. 2) to store parity information associated with the RAIN algorithm.

The block diagram may include a quantity of dies 160 (e.g., four dies 160, any quantity of dies 160), where each die 160 may include a quantity of planes 165 (e.g., 6 planes 165, any quantity of planes 165). Each plane may include a plurality of pages, which may be organized into several different groupings. For example, the pages of each plane 165 may be organized into one or more blocks (e.g., not shown), and further organized into one or more sub-blocks 305, which may be represented in the block diagram 300 as a column of pages (e.g., pages 0-5 in one column of a plane 165). Further, a row of pages across each plane 165 of a die 160 (e.g., all of the pages 0 of each plane 165 of the die 160) may constitute a word-line, and one or more word-lines may constitute a word-line group 310, such that a die 160 may include one or more word-line groups 310 (e.g., a word-line group 310-*a* of die 160-*a*, and a word-line group 310-*b* of the die 160-*b*).

Depending on a level of the planes 165 (e.g., SLC, TLC, QLC), each page may include one or more virtual pages. For example, in the case that the planes 165 (e.g., or one or more planes 165) of the die 160-*a* include TLC blocks, each page may store three virtual pages, which may be logical divisions of data stored in each page. For example, each page may include a upper page, a lower page, and an extra page. However, in the case that the planes 165 of the die 160-*a* include SLC blocks, each page may store a single virtual page of data.

To implement a RAIN algorithm for data protection in a memory system, the memory system may write data to a die 160 according to a specified pattern. For example, the memory system may write data by page-line, where a page-line may include one page in a same location in each plane 165 of a die 160. For example, a first page-line of a die 160-*a* may include a first page (e.g., page 0) of a first sub-block of a first plane 165 (e.g., sub-block 305-*a* of a plane 165-*a*), a first page of a first sub-block of a second plane 165 (e.g., sub-block 305-*c* of a plane 165-*b*), and so on for each plane 165 of the die 160-*a*. A second page-line of the die 160-*a* may include a first page of a second sub-block of the first plane 165 (e.g., sub-block 305-*b* of the plane 165-*a*), a first page of a second sub-block of the second plane 165 (e.g., sub-block 305-*d* of the plane 165-*b*), and so on for each plane 165 of the die 160-*a*. Data written to a die 160 according to a RAIN algorithm may be split amongst pages of each plane 165 of the die 160 (e.g., regardless of a timing order in which the memory device writes the data to the die 160).

As part of the RAIN algorithm, the memory system (e.g., a memory system controller 115, a local controller 135) may calculate parity information for the data written to the die 160 before writing the data to the die 160. The memory system may calculate parity information for a first page-line of the data being written to the die 160 by combining (e.g., XORing) the pages of data that are written to the first page-line. In a case where each page comprises a plurality of virtual pages, each corresponding virtual page of data of each page of the page-line (e.g., a virtual page-line) may be combined (e.g., XORed) to form parity information for each virtual page, and the parity information of the virtual pages may be further combined to form parity information for the page-line. After calculating parity information for each page-line of a first word-line group 310, the memory system may combine (e.g., XOR) parity information of corresponding page-lines from subsequent word-line groups 310 to form a parity information (e.g., one page of parity information for each virtual page of data in a word-line group 310) for the die 160. After beginning to write the data to the die 160, the parity information may be transferred (e.g., flushed) from the cache memory to one or more pages of the die 160.

In some memory systems, while calculating the parity information for the die 160, a cache memory of the memory system (e.g., RAM, SRAM, DRAM, a local memory 120, another memory) may store the calculated and combined parity information for the die 160. For example, if the die 160 includes four pages in a plane 165 per word-line, and two word-lines per word-line group 310 (e.g., as shown exemplarily in the block diagram 300, eight page-lines per word-line group), the cache memory may store eight pages of parity information for SLC writes at the die 160, or 24 pages of parity information for TLC writes at the die 160. Assuming parity information for each page-line can be stored in a quantity of memory (e.g., 16 KB), the memory used at the cache memory to store the parity information may equal the quantity of pages of parity information multiplied by the quantity of memory for each page of parity information (e.g., 128 KB for SLC writes, 384 KB for TLC writes). Storing such quantities of parity information in the cache memory may reduce available cache memory for other useful operations at the memory system.

According to techniques described herein, the memory system may store the parity information in one or more latches (e.g., the latches 205 as described with respect to FIG. 2) corresponding to each plane 165 of a die 160. Storing the parity information in the latches may increase an availability of the cache memory for other operations, increasing the performance of a memory system. Additionally, the memory system may interleave operations for storing the parity information in the latches 205 within a programming window of a write operation (e.g., according to an interleaving scheme), such that the memory system may not experience increased latency due to storing or transferring the parity information in the latches 205.

Figure 4:
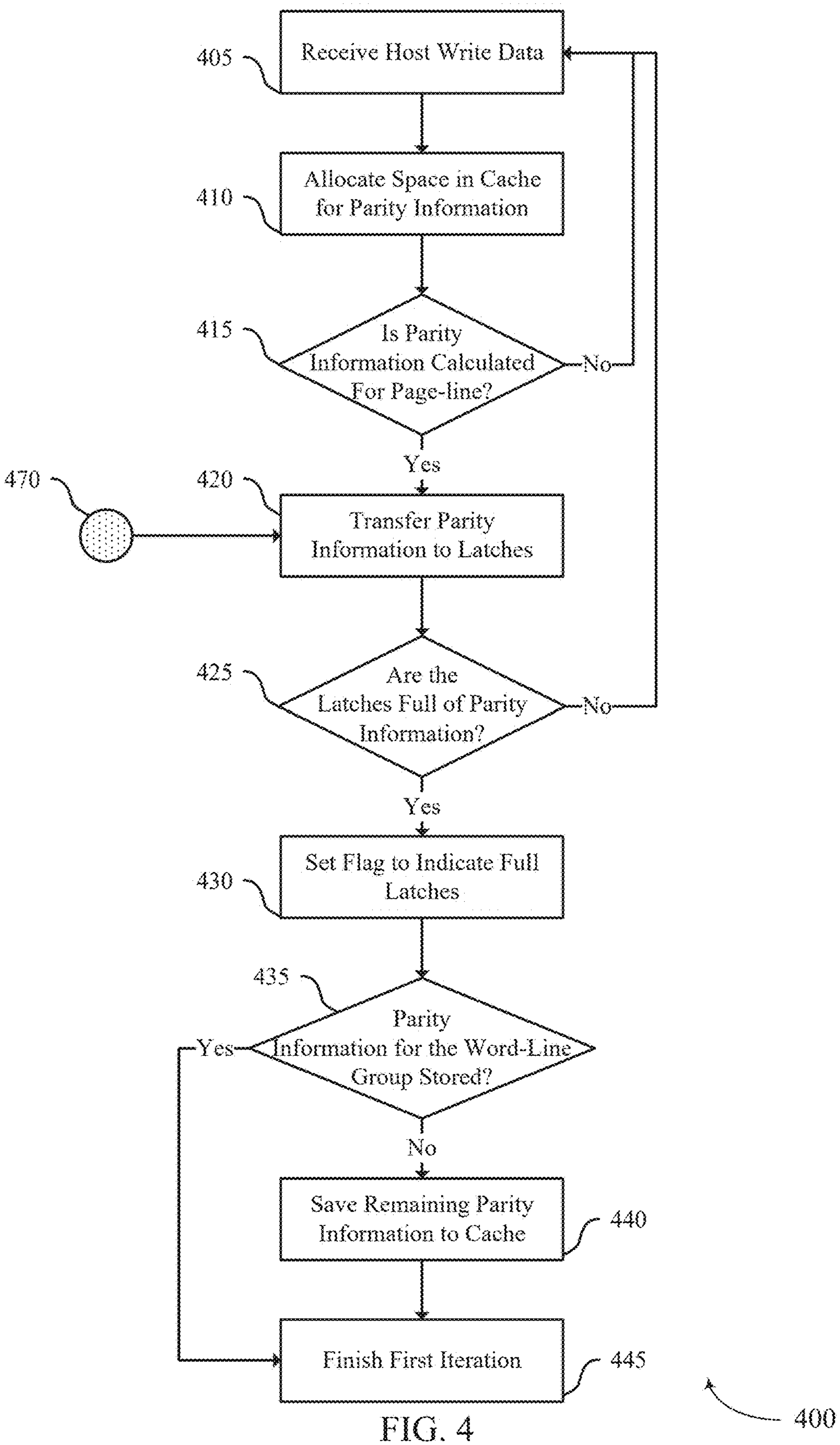
FIGS. 4 through 6 show examples of flowcharts that supports redundant array parity information storage in accordance with examples as disclosed herein.

FIG. 4 shows an example of a flowchart 400 that supports redundant array parity information storage in accordance with examples as disclosed herein. In some cases, aspects of the flowchart 400 may implement or be implemented by aspects of FIGS. 1-3. For example, the flowchart 500 may include one or more operations which may be performed by one or more components of a memory system or a memory device, such as the memory systems 110 or the memory devices 130 as described herein with respect to FIGS. 1-3. In some aspects, the flowchart 400 may depict operations for a first iteration in a process of calculating parity information and storing parity information in one or more latches associated with a memory die. The first iteration may include calculating and storing parity information for a first word-line group (e.g., as described herein with respect to FIG. 3) of data associated with one or more host write commands.

In the following description of flowchart 400 (e.g., as well as flowchart 500 and flowcharts 600 described herein with respect to FIGS. 5 and 6, respectively), the operations may be performed in a different order than the order shown, or other operations may be added or removed from the flowchart 400. For example, some operations may be left out of flowchart 400, may be performed in different orders or at different times, or other operations may be added to flowchart 400. Although a memory system may perform the operations of flowchart 400, some aspects of some operations may also be performed by a memory device 130, a memory system controller 115, a local controller 135, or any combination thereof. Additionally, each operation in flowchart 400 (e.g., as well as flowchart 500 and flowcharts 600) may be implemented in instructions or firmware stored on memory of a memory system 110 (e.g., a memory device 130, local memory 120) and executed by the memory system controller 115, a local controller 135, or a combination thereof. Additionally, or alternatively, aspects of the flowchart 400 (e.g., as well as flowchart 500 and flowcharts 600) may be implemented as instructions stored in one or more memories (e.g., firmware stored in one or more memories coupled with a memory system 110). For example, the instructions, when executed by one or more controllers (e.g., the memory system controller 115, a local controller 135), may cause the one or more controllers (or a device or a system) to perform the operations of the flowchart 400 (e.g., or the flowchart 500 and flowcharts 600).

At 405, the memory system may receive data associated with one or more write commands from a host system (e.g., the host system 105 as described herein with respect to FIG. 1). The memory system may associate the data with a die of the memory system, and may begin calculating parity information associated with the data.

At 410, the memory system may allocate memory in a cache memory (e.g., RAM, SRAM, DRAM, the local memory 120 as described herein with respect to FIG. 2) to store some parity information. For example, the memory system may allocate enough memory to store parity information for a page-line of data (e.g., including each virtual page of a page-line, as described herein with respect to FIG. 3). As one example, if the write command indicates a TLC write (e.g., three virtual pages per page), the memory system may allocate 3 pages of cache memory (e.g., 48 KB) to store parity information for the page-line. For example, each page in the cache memory may store (e.g., maintain) the calculated parity information of each virtual page-line of the page-line of data that the memory system will write to the die next. In some cases, the amount of allocated cache memory according to techniques described herein may be less than an amount of allocated cache memory according to other techniques (e.g., conventional RAIN parity storage techniques described herein with respect to FIG. 3).

At 415, the memory system may finish calculating the parity information for a first page-line of the data, and may determine whether the parity information for the page-line has been calculated. If the parity information has not been calculated for the page-line (e.g., "No"), the memory system may return to 405 to receive more data from the host system for the page-line. If the parity information has been calculated for the page-line (e.g., "Yes"), the memory system may, at 420, transfer the calculated parity information from the cache memory to one or more unused latches of the memory system (e.g., as described herein with respect to FIG. 2, latches that the memory system may not use for the write operation). In some cases, the memory system may transfer the parity information to the unused latches after the memory system has begun programming the page-line with the host data (e.g., after a programming window has begun, while writing the first page-line of data, concurrently with writing the first page-line of data, as described herein with respect to FIG. 6). At 470, a memory system may enter the operations of 420 from other operations described herein with respect to FIG. 5.

In some cases, the memory system may transfer the parity information to first available unused latches of the die (e.g., in case of a TLC write in a QLC capable memory system, unused latches associated with planes 0, 1, and 2 of the die) associated with the data. As one example (e.g., in TLC writes to QLC capable systems), the memory system may store the parity information in one unused latch per page of parity information. Thus, three latches may store parity information for a first page-line of a TLC write operation, and one latch may store parity information for a first page-line of an SLC write operation.

At 425, the memory system may determine whether the memory system has filled each of the unused latches with parity information (e.g., if there are more unused latches in which to store parity information). If the memory system has not filled each of the unused latches with parity information (e.g., "No"), the memory system may return to 405 to receive more host write data. Alternatively, the memory system may have not filled each of the unused latches with parity information due to having more space in the latches for parity information than the parity information for the first page-line can fill (e.g., "Yes" at 435), in which case the memory system may go to 445. If the memory system has filled each of the unused latches with parity information (e.g., "Yes"), the memory system may, at 430, set a flag (e.g., within an internal register, within a memory device) to indicate that each of the unused latches is full of parity information (e.g., that there are no more latches to use for storing parity information).

At 435, the memory system may determine whether the memory system has calculated and stored the parity information for each page-line of a first word-line group (e.g., if there is more parity information yet to be calculated and stored for the first word-line group). If the memory system has calculated and stored the parity information for each page-line of a first word-line group (e.g., "Yes," there is no more parity information to be calculated and stored for the first word-line group), the memory system may, at 445, finish the first iteration of calculating and storing parity information for the data associated with the write command. If the memory system has not (e.g., "No," there is more parity information to be calculated and stored for the first word-line group), the memory system may, at 440, calculate and store any additional parity information for the first word-line group in the cache memory of the memory system. For example, the memory system may store parity information in the cache memory after storing parity information in the unused latches if a die of the memory system include less planes (e.g., and thus less unused latches, as described herein with respect to FIG. 2) than a quantity of page-lines in each word-line group.

Thus, a memory system may calculate parity information for a first word-line group of a die and storing the parity information (e.g., at least a portion of the parity information) in unused latches of the die. FIG. 5 may include a flowchart 500 that describes a memory system calculating subsequent parity information for subsequent word-line groups and storing the subsequent parity information (e.g., at least a portion thereof) in the latches according to techniques described herein.

Figure 5:
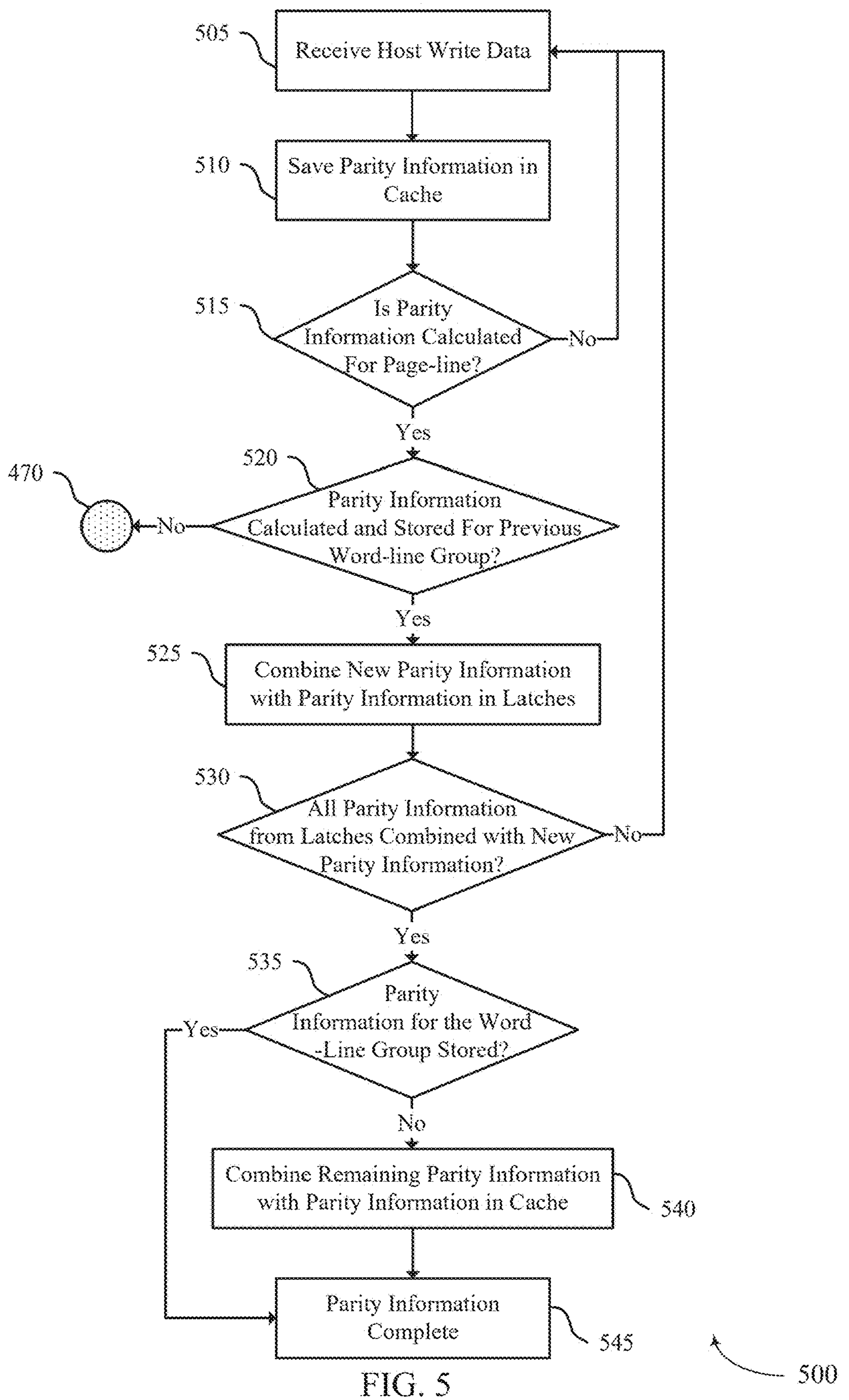

FIG. 5 shows an example of a flowchart 500 that supports redundant array parity information storage in accordance with examples as disclosed herein. In some cases, aspects of the flowchart 500 may implement or be implemented by aspects of FIGS. 1-4. For example, the flowchart 500 may include one or more operations which may be performed by one or more components of a memory system or a memory device, such as the memory systems 110 or the memory devices 130 as described herein with respect to FIGS. 1-4. In some aspects, the flowchart 500 may depict operations for later iterations in a process of calculating parity information and storing parity information in one or more latches associated with a memory die, where a first iteration may be described with respect to FIG. 4. Each later iteration may be associated with a subsequent word-line groups (e.g., subsequent to the previous word-line groups, including the first word-line group of FIG. 4) of data associated with one or more host write commands.

At 505, the memory system may receive host write data for the subsequent word-line group (e.g., for a first word-line of the subsequent word-line group). In some cases, the host write data may be associated with one or more host write commands, which may be the same or different from the one or more host write commands described herein with respect to FIG. 4. At 510, the memory system may calculate parity information for a first page-line of the host data and may store the parity information in the cache memory (e.g., in the cache memory allocated at 410 of the flowchart 400).

At 515, the memory system may determine whether the parity information for a first page-line has been calculated. If the parity information for the first page-line has not been calculated (e.g., "No"), the memory system may return to 505 and receive more host write data for the page-line. If the parity information for the page-line has been calculated (e.g., "Yes"), the memory system may, at 520, determine whether parity information for a previous word-line group (e.g., the first word-line group of FIG. 4 in the case of the subsequent word-line group being a second word-line group) has been calculated and stored (e.g., as described herein with respect to FIG. 4). If the parity information for the previous word-line group has not been calculated and stored (e.g., "No"), the memory system may go to 470, which may cause the memory system to return to 420 as described with respect to FIG. 4 (e.g., the data from the one or more write commands may not be for a subsequent word-line group). If the parity information for the previous word-line group has been calculated and stored (e.g., "Yes"), the memory system may enter 525.

At 525, the memory system may combine (e.g., XOR) the parity information for the first page-line of the subsequent word-line group with parity information for a first page-line of the previous word-line groups. For example, the memory system may transfer the parity information associated with the first page-line of the previous word-line groups from the latches (e.g., through an open NAND flash interface) to the cache memory and combine the parity information associated with the subsequent word-line group with the parity information associated with the previous word-line groups. The memory system may then transfer the combined parity information back to the latches. In some cases, the memory system may combine the parity information for the respective page-lines (e.g., and perform any transferring associate with the combining) after the memory system has begun programming the first page-line of the subsequent word-line group (e.g., after the programming window has begun).

At 530, the memory system may determine whether the parity information for each page-line of the previous word-line groups (e.g., stored in the latches) has been combined with new parity information for corresponding page-lines of the subsequent word-line group. If not (e.g., "No"), the memory system may return to 505 to receive more host write data. If so (e.g., "Yes"), the memory system may, at 535, determine whether the memory system has calculated and stored the parity information for each page-line of the subsequent word-line group. For example, the memory system may determine whether there is more parity information to be determined for the subsequent word-line group than can be combined with the parity information stored in the latches for the previous word-line groups. If the memory system has calculated and stored the parity information for each page-line of the subsequent word-line group (e.g., "Yes"), the memory system may complete the parity information for that iteration at 545 (e.g., and return to 505 for another subsequent word-line group). If not (e.g., "No"), the memory system may, at 540, combine remaining parity information for remaining page-lines of the subsequent word-line group with parity information from corresponding page-lines of previous word-line groups stored in the cache memory, and may complete the parity information for the subsequent word-line group at 545.

In some cases, the memory system may repeat the operations of the flowchart 500 for each subsequent word-line group of a die until completing a parity information for the die (e.g., for a set of word-line groups). When the memory system has completed the parity information for the die, the memory system may transfer the completed parity information for the die (e.g., that includes the previous and subsequent word-line groups) to one or more pages of the die.

In some cases, the memory system may transfer parity information (e.g., after each page-line write operation) via an interleaving scheme associated with a programming window of the memory system. For example, the memory system may transfer the calculated parity information to the latches, transfer previous parity information from the latches and to the cache memory, and transfer the combined parity information from the cache memory to the latches concurrently with one or more write operations performed within the programming window for a respective page-line. Thus, the memory system may intelligently interleave the transferring of the parity information during the programming window (e.g., during ONFI transfer from the used latches to the memory die) without additional latency to the write operation.

In some cases, one or more operations of the flowcharts 400 and 500 may be interrupted by other operations (e.g., garbage collection, data folding), which may utilize a higher quantity of the latches. For example, the memory system may have no unused latches to store the parity information during the other operations. In some cases, the memory system may transfer the parity information to a die during the other operations, and may transfer the parity information back to the latches after the other operations, which may be described herein with respect to FIG. 6.

Figure 6:
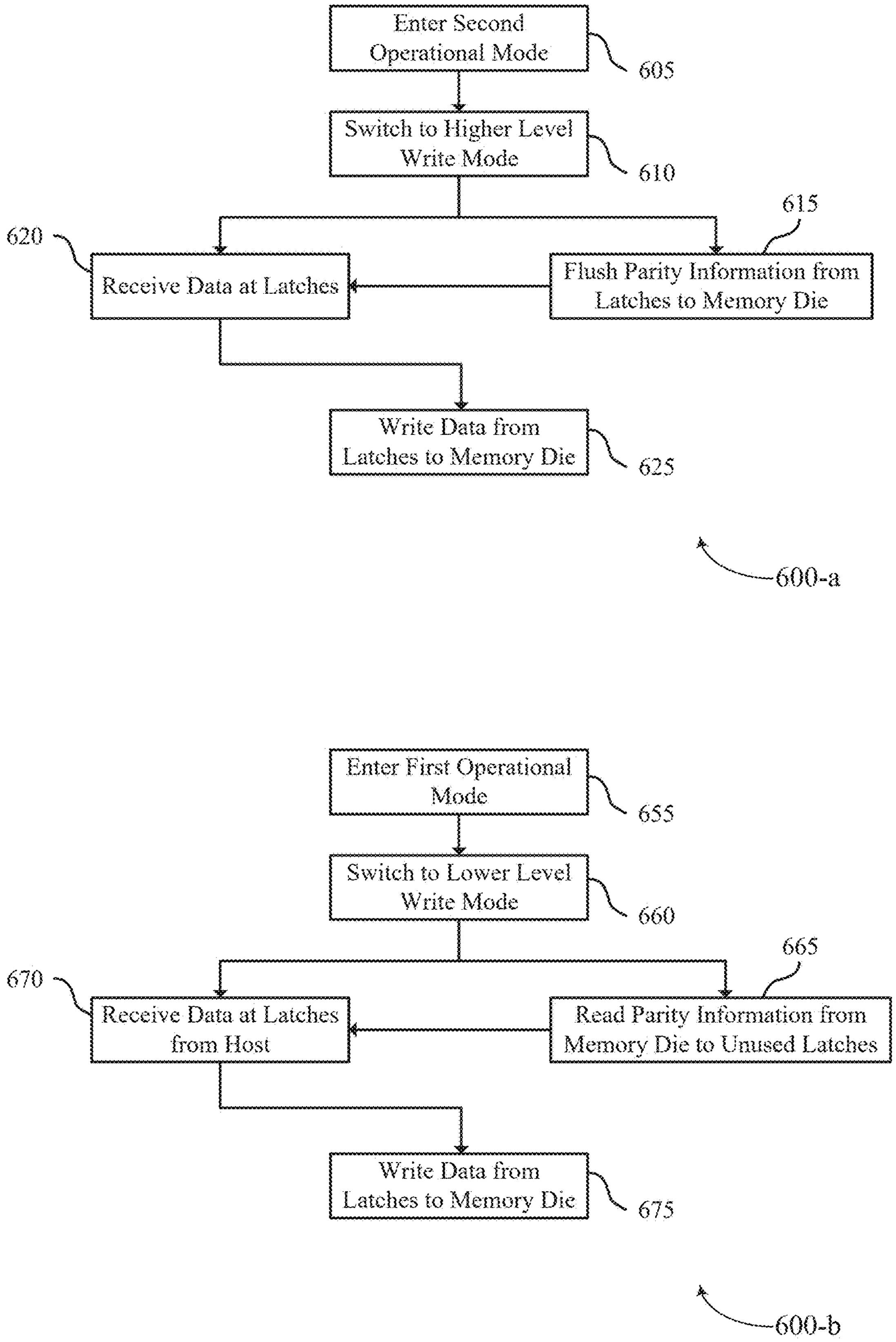

FIG. 6 shows examples of flowcharts 600 (e.g., a flowchart 600-*a*, a flowchart 600-*b*) that support redundant array parity information storage in accordance with examples as disclosed herein. In some cases, aspects of the flowcharts 600 may implement or be implemented by aspects of FIGS. 1-5. For example, operations of the flowcharts 600 may be implemented by a memory system or a memory device, which may be examples of the memory systems 110 or the memory device 130 as described herein with respect to FIGS. 1-5. In some cases, the memory system may perform the operations of the flowcharts 600 in between operations of the flowchart 400, in between operations of the flowchart 500, or both. In some aspects, the flowchart 600-*a* may depict one or more operations performed at the memory system when switching from a lower level write mode (e.g., SLC, TLC) to a higher level write mode (e.g., QLC), and the flowchart 600-*b* may depict one or more operations performed at the memory system when switching from a higher level write mode (e.g., QLC) to a lower level write mode (e.g., TLC, SLC). Such operations may allow the memory system to utilize one or more latches (e.g., latches 205 as described herein with respect to FIG. 2) to store parity information, which may free up cache memory for other operations at the memory system.

In the following description of flowcharts 600, the operations may be performed in a different order than the order shown, or other operations may be added or removed from the flowcharts 600. For example, some operations may be left out of flowcharts 600, may be performed in different orders or at different times, or other operations may be added to flowcharts 600. Although a memory system may perform the operations of flowcharts 600, some aspects of some operations may also be performed by a memory device 130, a memory system controller 115, a local controller 135, or any combination thereof.

With respect to the flowchart 600-*a*, at 605 the memory system may enter a second operational mode from a first operational mode. For example, the second operational mode may be for data folding, garbage collection, or other operations which utilize higher level write modes (e.g., QLC), and the first operational mode may be for writing host data, or other operations which utilize a lower level write mode (e.g., SLC, TLC). In some cases, the memory system may switch operational modes in response to a periodic data maintenance procedure, the memory system entering a low energy mode (e.g., power savings mode, sleep mode), or both. At 610, the memory system may switch to a higher level write mode to perform one or more operations within the second operational mode in response to entering the second operational mode.

In a case where the memory system is storing parity information in latches of a die, at 615 the memory system may transfer (e.g., flush) the parity information from the latches of a die to one or more pages (e.g., one or more NAND cells) of the die in response to switching to the higher level write mode. In some cases, such operations may cause the latches to be available for one or more operations of the higher level write mode.

At 620, the memory system may receive data to the latches via an ONFI (e.g., from a host system, from another portion of the memory system due to garbage collection operations, folding operations, or another operation). For example, the latches may include one or more PDCs and one or more SDCs. In some cases, the memory system may receive the data in the one or more SDCs and transfer the data to the one or more PDCs. Because of the higher level write mode, the host data may utilize each of the one or more PDCs, which may not leave room for storing parity information in the latches. At 625 the data may be programmed from the latches to the one or more pages of the die.

In some cases, after a switch from a lower level write mode to a higher level write mode (e.g., at 610), the memory system may intelligently transfer the parity information stored in the latches of the die into pages of the die (e.g., at 615) according to an interleaving scheme associated with a programming window of the higher level write operation. For example, while the pages of data associated with the higher level write are being transferred into the pages of the die (e.g., at 625), the memory system may concurrently transfer the parity information to the pages of the die. Thus, transferring the parity information to the pages of the die may not incur further latency at the memory cell.

With respect to the flowchart 600-*b*, at 655 the memory system may enter the first operational mode from the second operational mode. At 6600, the memory system may switch to a lower level write mode to perform one or more operations within the first operational mode in response to entering the first operational mode.

At 665, due to the lower level write mode utilizing fewer latches of a die (e.g., and in response to switching to the lower level write mode), the memory system may transfer (e.g., flush) the parity information from one or more pages of the die to one or more unused latches (e.g., unused for the lower level write mode). Such operations may reduce memory usage at a cache memory (e.g., in comparison to storing the parity information in the cache memory) and may provide memory in the die host data associated with the lower level write mode.

At 670, the memory system may receive data to the latches via an ONFI (e.g., from a host system, from another portion of the memory system due to garbage collection operations, folding operations, or another operation). Because of the lower level write mode, the host data may not utilize one or more of the PDCs (e.g., one or more of the latches), which may leave room for storing parity information in the latches. At 675 the data may be programmed from the used latches to the one or more pages of the die.

In some cases, after a switch from a higher level write mode to a lower level write mode (e.g., at 660), the memory system may intelligently transfer the parity information stored in the pages of the die to the latches of the die (e.g., at 665) according to an interleaving scheme associated with a ONFI page transfer window of the lower level write operation. For example, while the pages of data associated with the lower level write operation are being transferred into the latches of the die via the ONFI (e.g., at 670), the memory system may concurrently transfer the parity information to the latches of the die. Thus, transferring the parity information to the latches of the die may not incur further latency at the memory system.

Figure 7:
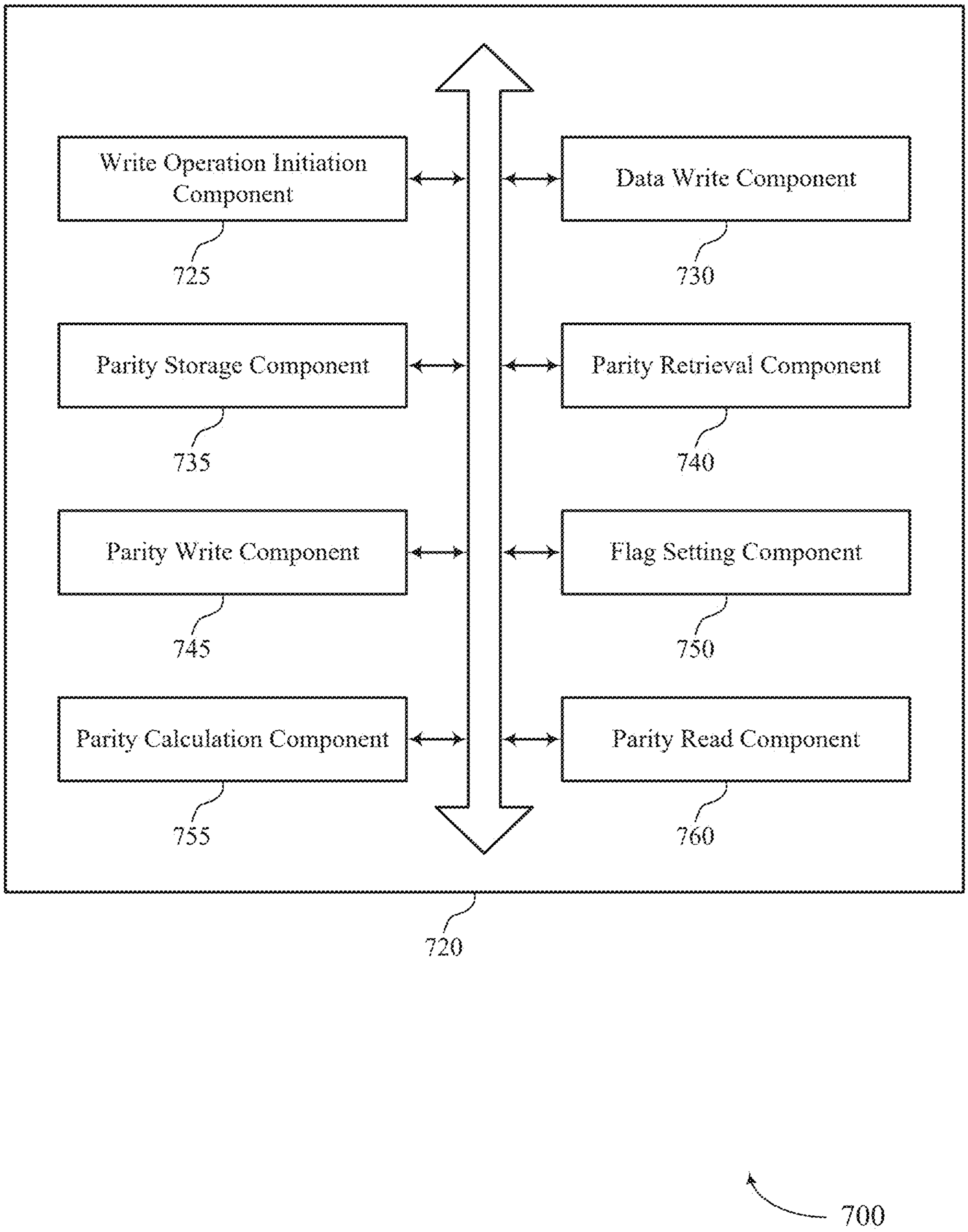
FIG. 7 shows a block diagram of a memory system that supports redundant array parity information storage in accordance with examples as disclosed herein.

FIG. 7 shows a block diagram 700 of a memory system 720 that supports redundant array parity information storage in accordance with examples as disclosed herein. The memory system 720 may be an example of aspects of a memory system as described with reference to FIGS. 1 through 6. The memory system 720, or various components thereof, may be an example of means for performing various aspects of redundant array parity information storage as described herein. For example, the memory system 720 may include a write operation initiation component 725, a data write component 730, a parity storage component 735, a parity retrieval component 740, a parity write component 745, a flag setting component 750, a parity calculation component 755, a parity read component 760, or any combination thereof. Each of these components, or components of subcomponents thereof (e.g., one or more processors, one or more memories), may communicate, directly or indirectly, with one another (e.g., via one or more buses).

The write operation initiation component 725 may be configured as or otherwise support a means for initiating a first write operation of a first plurality of pages of data to a first word-line group associated with respective memory arrays of one or more memory dies according to a first write mode, where the one or more memory dies include a plurality of sets of data latches, and where each set of data latches of the plurality of sets of data latches is associated with storing a page of data for access operations associated with the respective memory arrays of the one or more memory dies. The data write component 730 may be configured as or otherwise support a means for writing the first plurality of pages of data to the first word-line group associated with the one or more memory dies. The parity storage component 735 may be configured as or otherwise support a means for storing first parity information for the first plurality of pages of data in one or more data latches of the plurality of sets of data latches in response to writing the first plurality of pages of data. In some examples, the write operation initiation component 725 may be configured as or otherwise support a means for initiating a second write operation of a second plurality of pages of data to a second word-line group associated with the one or more memory dies according to the first write mode. The parity retrieval component 740 may be configured as or otherwise support a means for retrieving the first parity information from the one or more data latches in response to initiating the second write operation. In some examples, the data write component 730 may be configured as or otherwise support a means for writing the second plurality of pages of data to the second word-line group associated with the one or more memory dies. The parity write component 745 may be configured as or otherwise support a means for writing second parity information for the second plurality of pages of data to one or more memory arrays of the one or more memory dies, the second parity information calculated in accordance with the retrieved first parity information and the second plurality of pages of data.

In some examples, the first parity information is stored in the one or more data latches, retrieved from the data latches, or both, according to a time interleaving scheme within a first programming duration associated with the first write operation, a second programming duration associated with the second write operation, or both, respectively.

In some examples, the write operation initiation component 725 may be configured as or otherwise support a means for initiating, prior to initiating the second write operation, a third write operation according to a second write mode. In some examples, the data write component 730 may be configured as or otherwise support a means for writing, prior to initiating the second write operation, the first parity information from the one or more data latches to at least one memory array of the one or more memory dies in response to initiating the third write operation according to the second write mode.

In some examples, the first parity information is written from the one or more data latches to the at least one memory array within a data transfer duration associated with the third write operation.

In some examples, the parity read component 760 may be configured as or otherwise support a means for reading the first parity information from the at least one memory array back to the one or more data latches in response to completing the third write operation, where the first parity information is retrieved in response to reading the first parity information from the at least one memory array back to the one or more data latches.

In some examples, the first parity information is read from the at least one memory array back to the one or more data latches within a page transfer duration associated with the second write operation.

In some examples, the one or more data latches include a first set of data latches of the plurality of sets of data latches, and the flag setting component 750 may be configured as or otherwise support a means for setting a flag to indicate that the first set of data latches are incapable of storing more parity information in response to storing the first parity information in the one or more data latches. In some examples, the one or more data latches include a first set of data latches of the plurality of sets of data latches, and the write operation initiation component 725 may be configured as or otherwise support a means for initiating a third write operation of a third plurality of pages of data to the first word-line group associated with the one or more memory dies according to the first write mode. In some examples, the one or more data latches include a first set of data latches of the plurality of sets of data latches, and the parity calculation component 755 may be configured as or otherwise support a means for calculating third parity information for the third plurality of pages of data in response to initiating the third write operation. In some examples, the one or more data latches include a first set of data latches of the plurality of sets of data latches, and the data write component 730 may be configured as or otherwise support a means for writing the third plurality of pages of data to the first word-line group of the respective memory arrays of the one or more memory dies. In some examples, the one or more data latches include a first set of data latches of the plurality of sets of data latches, and the parity storage component 735 may be configured as or otherwise support a means for storing the third parity information in a cache memory of the memory system in response to the flag being set.

In some examples, the write operation initiation component 725 may be configured as or otherwise support a means for initiating a fourth write operation of a fourth plurality of pages of data to the second word-line group associated with the one or more memory dies according to the first write mode. In some examples, the parity retrieval component 740 may be configured as or otherwise support a means for retrieving the third parity information from the cache memory of the memory system in response to initiating the fourth write operation. In some examples, the parity calculation component 755 may be configured as or otherwise support a means for calculating fourth parity information in accordance with the retrieved third parity information and the fourth plurality of pages of data. In some examples, the data write component 730 may be configured as or otherwise support a means for writing the fourth plurality of pages of data to the second word-line group associated with the one or more memory dies. In some examples, the parity storage component 735 may be configured as or otherwise support a means for storing the fourth parity information in the cache memory of the memory system in response to the third parity information being retrieved from the cache memory, the flag being set, or both.

In some examples, the parity storage component 735 may be configured as or otherwise support a means for storing, prior to the second parity information being written to the one or more memory arrays, the second parity information in the one or more data latches in response to calculating the second parity information.

In some examples, the memory system supports a plurality of write modes that includes at least the first write mode and a second write mode. In some examples, the first write mode is associated with writing a first quantity of bits to one memory cell and the second write mode of the plurality of write modes is associated with writing a second quantity of bits to one memory cell that is greater than the first quantity of bits.

In some examples, the first parity information is stored in the one or more data latches of the plurality of sets of data latches in response to the one or more data latches being associated with writing data according to the second write mode and not being associated with writing data according to the first write mode.

In some examples, each memory die of the one or more memory dies includes a plurality of planes. In some examples, each set of data latches of the plurality of sets of data latches includes respective subsets of data latches associated with each plane of the plurality of planes. In some examples, the one or more data latches include a plurality of subsets of data latches associated with one or more planes of the plurality of planes.

In some examples, each plane of the plurality of planes of the each memory die includes a plurality of sub-blocks. In some examples, calculating the first parity information for the first plurality of pages of data includes calculating respective portions of the first parity information for respective sub-blocks of the plurality of sub-blocks across the one or more memory dies and the plurality of planes.

In some examples, the described functionality of the memory system 720, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 720, or various components thereof, may be implemented at least in part by instructions (e.g., stored in memory, non-transitory computer-readable medium) executable by such at least one processor.

Figure 8:
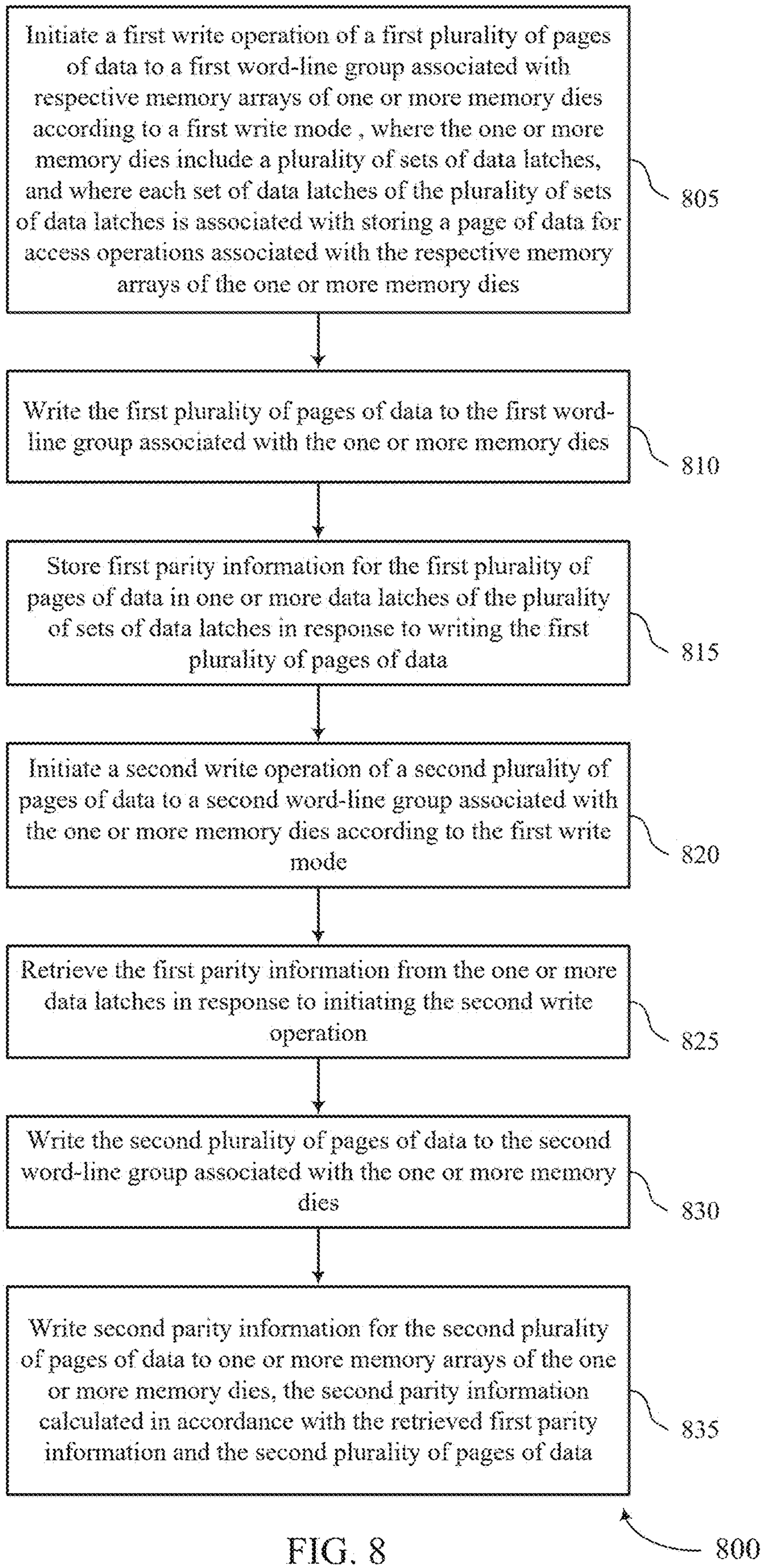
FIG. 8 shows a flowchart illustrating a method or methods that support redundant array parity information storage in accordance with examples as disclosed herein.

FIG. 8 shows a flowchart illustrating a method 800 that supports redundant array parity information storage in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include initiating a first write operation of a first plurality of pages of data to a first word-line group associated with respective memory arrays of one or more memory dies according to a first write mode, where the one or more memory dies include a plurality of sets of data latches, and where each set of data latches of the plurality of sets of data latches is associated with storing a page of data for access operations associated with the respective memory arrays of the one or more memory dies. In some examples, aspects of the operations of 805 may be performed by a write operation initiation component 725 as described with reference to FIG. 7.

At 810, the method may include writing the first plurality of pages of data to the first word-line group associated with the one or more memory dies. In some examples, aspects of the operations of 810 may be performed by a data write component 730 as described with reference to FIG. 7.

At 815, the method may include storing first parity information for the first plurality of pages of data in one or more data latches of the plurality of sets of data latches in response to writing the first plurality of pages of data. In some examples, aspects of the operations of 815 may be performed by a parity storage component 735 as described with reference to FIG. 7.

At 820, the method may include initiating a second write operation of a second plurality of pages of data to a second word-line group associated with the one or more memory dies according to the first write mode. In some examples, aspects of the operations of 820 may be performed by a write operation initiation component 725 as described with reference to FIG. 7.

At 825, the method may include retrieving the first parity information from the one or more data latches in response to initiating the second write operation. In some examples, aspects of the operations of 825 may be performed by a parity retrieval component 740 as described with reference to FIG. 7.

At 830, the method may include writing the second plurality of pages of data to the second word-line group associated with the one or more memory dies. In some examples, aspects of the operations of 830 may be performed by a data write component 730 as described with reference to FIG. 7.

At 835, the method may include writing second parity information for the second plurality of pages of data to one or more memory arrays of the one or more memory dies, the second parity information calculated in accordance with the retrieved first parity information and the second plurality of pages of data. In some examples, aspects of the operations of 835 may be performed by a parity write component 745 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating a first write operation of a first plurality of pages of data to a first word-line group associated with respective memory arrays of one or more memory dies according to a first write mode, where the one or more memory dies include a plurality of sets of data latches, and where each set of data latches of the plurality of sets of data latches is associated with storing a page of data for access operations associated with the respective memory arrays of the one or more memory dies; writing the first plurality of pages of data to the first word-line group associated with the one or more memory dies; storing first parity information for the first plurality of pages of data in one or more data latches of the plurality of sets of data latches in response to writing the first plurality of pages of data; initiating a second write operation of a second plurality of pages of data to a second word-line group associated with the one or more memory dies according to the first write mode; retrieving the first parity information from the one or more data latches in response to initiating the second write operation; writing the second plurality of pages of data to the second word-line group associated with the one or more memory dies; and writing second parity information for the second plurality of pages of data to one or more memory arrays of the one or more memory dies, the second parity information calculated in accordance with the retrieved first parity information and the second plurality of pages of data.

Aspect 2: The method, apparatus, or non-transitory computer-readable medium of aspect 1, where the first parity information is stored in the one or more data latches, retrieved from the data latches, or both, according to a time interleaving scheme within a first programming duration associated with the first write operation, a second programming duration associated with the second write operation, or both, respectively.

Aspect 3: The method, apparatus, or non-transitory computer-readable medium of any of aspects 1 through 2, further including operations, features, circuitry, logic, means, or instructions, or any combination thereof for initiating, prior to initiating the second write operation, a third write operation according to a second write mode and writing, prior to initiating the second write operation, the first parity information from the one or more data latches to at least one memory array of the one or more memory dies in response to initiating the third write operation according to the second write mode.

Aspect 4: The method, apparatus, or non-transitory computer-readable medium of aspect 3, where the first parity information is written from the one or more data latches to the at least one memory array within a data transfer duration associated with the third write operation.

Aspect 5: The method, apparatus, or non-transitory computer-readable medium of any of aspects 3 through 4, further including operations, features, circuitry, logic, means, or instructions, or any combination thereof for reading the first parity information from the at least one memory array back to the one or more data latches in response to completing the third write operation, where the first parity information is retrieved in response to reading the first parity information from the at least one memory array back to the one or more data latches.

Aspect 6: The method, apparatus, or non-transitory computer-readable medium of aspect 5, where the first parity information is read from the at least one memory array back to the one or more data latches within a page transfer duration associated with the second write operation.

Aspect 7: The method, apparatus, or non-transitory computer-readable medium of any of aspects 1 through 6, where the one or more data latches include a first set of data latches of the plurality of sets of data latches and the method, apparatuses, and non-transitory computer-readable medium further includes operations, features, circuitry, logic, means, or instructions, or any combination thereof for setting a flag to indicate that the first set of data latches are incapable of storing more parity information in response to storing the first parity information in the one or more data latches; initiating a third write operation of a third plurality of pages of data to the first word-line group associated with the one or more memory dies according to the first write mode; calculating third parity information for the third plurality of pages of data in response to initiating the third write operation; writing the third plurality of pages of data to the first word-line group of the respective memory arrays of the one or more memory dies; and storing the third parity information in a cache memory of the memory system in response to the flag being set.

Aspect 8: The method, apparatus, or non-transitory computer-readable medium of aspect 7, further including operations, features, circuitry, logic, means, or instructions, or any combination thereof for initiating a fourth write operation of a fourth plurality of pages of data to the second word-line group associated with the one or more memory dies according to the first write mode; retrieving the third parity information from the cache memory of the memory system in response to initiating the fourth write operation; calculating fourth parity information in accordance with the retrieved third parity information and the fourth plurality of pages of data; writing the fourth plurality of pages of data to the second word-line group associated with the one or more memory dies; and storing the fourth parity information in the cache memory of the memory system in response to the third parity information being retrieved from the cache memory, the flag being set, or both.

Aspect 9: The method, apparatus, or non-transitory computer-readable medium of any of aspects 1 through 8, further including operations, features, circuitry, logic, means, or instructions, or any combination thereof for storing, prior to the second parity information being written to the one or more memory arrays, the second parity information in the one or more data latches in response to calculating the second parity information.

Aspect 10: The method, apparatus, or non-transitory computer-readable medium of any of aspects 1 through 9, where the memory system supports a plurality of write modes that includes at least the first write mode and a second write mode and the first write mode is associated with writing a first quantity of bits to one memory cell and the second write mode of the plurality of write modes is associated with writing a second quantity of bits to one memory cell that is greater than the first quantity of bits.

Aspect 11: The method, apparatus, or non-transitory computer-readable medium of aspect 10, where the first parity information is stored in the one or more data latches of the plurality of sets of data latches in response to the one or more data latches being associated with writing data according to the second write mode and not being associated with writing data according to the first write mode.

Aspect 12: The method, apparatus, or non-transitory computer-readable medium of any of aspects 1 through 11, where each memory die of the one or more memory dies includes a plurality of planes; each set of data latches of the plurality of sets of data latches includes respective subsets of data latches associated with each plane of the plurality of planes; and the one or more data latches include a plurality of subsets of data latches associated with one or more planes of the plurality of planes.

Aspect 13: The method, apparatus, or non-transitory computer-readable medium of aspect 12, where each plane of the plurality of planes of the each memory die includes a plurality of sub-blocks and calculating the first parity information for the first plurality of pages of data includes calculating respective portions of the first parity information for respective sub-blocks of the plurality of sub-blocks across the one or more memory dies and the plurality of planes.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., processor-executable code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memories storing processor-executable code; and one or more processors coupled with the one or more memories and individually or collectively operable to execute the code to cause the memory system to:

initiate a first write operation of a first plurality of pages of data to a first word-line group associated with respective memory arrays of one or more memory dies according to a first write mode, wherein the one or more memory dies comprise a plurality of sets of data latches, and wherein each set of data latches of the plurality of sets of data latches is associated with storing a page of data for access operations associated with the respective memory arrays of the one or more memory dies;

write the first plurality of pages of data to the first word-line group associated with the one or more memory dies;

store first parity information for the first plurality of pages of data in one or more data latches of the plurality of sets of data latches in response to writing the first plurality of pages of data;

initiate a second write operation of a second plurality of pages of data to a second word-line group associated with the one or more memory dies according to the first write mode;

retrieve the first parity information from the one or more data latches in response to initiating the second write operation;

write the second plurality of pages of data to the second word-line group associated with the one or more memory dies; and write second parity information for the second plurality of pages of data to one or more memory arrays of the one or more memory dies, the second parity information calculated in accordance with the retrieved first parity information and the second plurality of pages of data.

2. The memory system of claim 1, wherein the first parity information is stored in the one or more data latches, retrieved from the data latches, or both, according to a time interleaving scheme within a first programming duration associated with the first write operation, a second programming duration associated with the second write operation, or both, respectively.

3. The memory system of claim 1, wherein the one or more processors are individually or collectively further operable to execute the code to cause the memory system to:

initiate, prior to initiating the second write operation, a third write operation according to a second write mode; and write, prior to initiating the second write operation, the first parity information from the one or more data latches to at least one memory array of the one or more memory dies in response to initiating the third write operation according to the second write mode.

4. The memory system of claim 3, wherein the first parity information is written from the one or more data latches to the at least one memory array within a data transfer duration associated with the third write operation.

5. The memory system of claim 3, wherein the one or more processors are individually or collectively further operable to execute the code to cause the memory system to:

read the first parity information from the at least one memory array back to the one or more data latches in response to completing the third write operation, wherein the first parity information is retrieved in response to reading the first parity information from the at least one memory array back to the one or more data latches.

6. The memory system of claim 5, wherein the first parity information is read from the at least one memory array back to the one or more data latches within a page transfer duration associated with the second write operation.

7. The memory system of claim 1, wherein the one or more data latches comprise a first set of data latches of the plurality of sets of data latches, and wherein the one or more processors are individually or collectively further operable to execute the code to cause the memory system to:

set a flag to indicate that the first set of data latches are incapable of storing more parity information in response to storing the first parity information in the one or more data latches;

initiate a third write operation of a third plurality of pages of data to the first word-line group associated with the one or more memory dies according to the first write mode;

calculate third parity information for the third plurality of pages of data in response to initiating the third write operation;

write the third plurality of pages of data to the first word-line group of the respective memory arrays of the one or more memory dies; and store the third parity information in a cache memory of the memory system in response to the flag being set.

8. The memory system of claim 7, wherein the one or more processors are individually or collectively further operable to execute the code to cause the memory system to:

initiate a fourth write operation of a fourth plurality of pages of data to the second word-line group associated with the one or more memory dies according to the first write mode;

retrieve the third parity information from the cache memory of the memory system in response to initiating the fourth write operation;

calculate fourth parity information in accordance with the retrieved third parity information and the fourth plurality of pages of data;

write the fourth plurality of pages of data to the second word-line group associated with the one or more memory dies; and store the fourth parity information in the cache memory of the memory system in response to the third parity information being retrieved from the cache memory, the flag being set, or both.

9. The memory system of claim 1, wherein the one or more processors are individually or collectively further operable to execute the code to cause the memory system to:

store, prior to the second parity information being written to the one or more memory arrays, the second parity information in the one or more data latches in response to calculating the second parity information.

10. The memory system of claim 1, wherein:

the memory system supports a plurality of write modes that comprises at least the first write mode and a second write mode, and the first write mode is associated with writing a first quantity of bits to one memory cell and the second write mode of the plurality of write modes is associated with writing a second quantity of bits to one memory cell that is greater than the first quantity of bits.

11. The memory system of claim 10, wherein the first parity information is stored in the one or more data latches of the plurality of sets of data latches in response to the one or more data latches being associated with writing data according to the second write mode and not being associated with writing data according to the first write mode.

12. The memory system of claim 1, wherein:

each memory die of the one or more memory dies comprises a plurality of planes, each set of data latches of the plurality of sets of data latches comprises respective subsets of data latches associated with each plane of the plurality of planes, and the one or more data latches comprise a plurality of subsets of data latches associated with one or more planes of the plurality of planes.

13. The memory system of claim 12, wherein:

each plane of the plurality of planes of the each memory die comprises a plurality of sub-blocks, and calculating the first parity information for the first plurality of pages of data comprises calculating respective portions of the first parity information for respective sub-blocks of the plurality of sub-blocks across the one or more memory dies and the plurality of planes.

14. A non-transitory computer-readable medium storing code comprising instructions which, when executed by one or more processors of a memory system, cause the memory system to:

initiate a first write operation of a first plurality of pages of data to a first word-line group associated with respective memory arrays of one or more memory dies according to a first write mode, wherein the one or more memory dies comprise a plurality of sets of data latches, and wherein each set of data latches of the plurality of sets of data latches is associated with storing a page of data for access operations associated with the respective memory arrays of the one or more memory dies;

write the first plurality of pages of data to the first word-line group associated with the one or more memory dies;

store first parity information for the first plurality of pages of data in one or more data latches of the plurality of sets of data latches in response to writing the first plurality of pages of data;

initiate a second write operation of a second plurality of pages of data to a second word-line group associated with the one or more memory dies according to the first write mode;

retrieve the first parity information from the one or more data latches in response to initiating the second write operation;

write the second plurality of pages of data to the second word-line group associated with the one or more memory dies; and write second parity information for the second plurality of pages of data to one or more memory arrays of the one or more memory dies, the second parity information calculated in accordance with the retrieved first parity information and the second plurality of pages of data.

15. The non-transitory computer-readable medium of claim 14, wherein the first parity information is stored in the one or more data latches, retrieved from the data latches, or both, according to a time interleaving scheme within a first programming duration associated with the first write operation, a second programming duration associated with the second write operation, or both, respectively.

16. The non-transitory computer-readable medium of claim 14, wherein the instructions, when executed by the one or more processors of the memory system, further cause the memory system to:

initiate, prior to initiating the second write operation, a third write operation according to a second write mode; and write, prior to initiating the second write operation, the first parity information from the one or more data latches to at least one memory array of the one or more memory dies in response to initiating the third write operation according to the second write mode.

17. The non-transitory computer-readable medium of claim 16, wherein the first parity information is written from the one or more data latches to the at least one memory array within a data transfer duration associated with the third write operation.

18. The non-transitory computer-readable medium of claim 16, wherein the instructions, when executed by the one or more processors of the memory system, further cause the memory system to:

read the first parity information from the at least one memory array back to the one or more data latches based at least in part on completing the third write operation, wherein the first parity information is retrieved in response to reading the first parity information from the at least one memory array back to the one or more data latches.

19. The non-transitory computer-readable medium of claim 18, wherein the first parity information is read from the at least one memory array back to the one or more data latches within a page transfer duration associated with the second write operation.

20. The non-transitory computer-readable medium of claim 14, wherein the one or more data latches comprise a first set of data latches of the plurality of sets of data latches, and wherein the instructions, when executed by the one or more processors of the memory system, further cause the memory system to:

set a flag to indicate that the first set of data latches are incapable of storing more parity information in response to storing the first parity information in the one or more data latches;

initiate a third write operation of a third plurality of pages of data to the first word-line group associated with the one or more memory dies according to the first write mode;

calculate third parity information for the third plurality of pages of data in response to initiating the third write operation;

write the third plurality of pages of data to the first word-line group of the respective memory arrays of the one or more memory dies; and store the third parity information in a cache memory of the memory system in response to the flag being set.

21. The non-transitory computer-readable medium of claim 20, wherein the instructions, when executed by the one or more processors of the memory system, further cause the memory system to:

initiate a fourth write operation of a fourth plurality of pages of data to the second word-line group associated with the one or more memory dies according to the first write mode;

retrieve the third parity information from the cache memory of the memory system in response to initiating the fourth write operation;

calculate fourth parity information in accordance with the retrieved third parity information and the fourth plurality of pages of data;

write the fourth plurality of pages of data to the second word-line group associated with the one or more memory dies; and store the fourth parity information in the cache memory of the memory system in response to the third parity information being retrieved from the cache memory, the flag being set, or both.

22. The non-transitory computer-readable medium of claim 14, wherein the instructions, when executed by the one or more processors of the memory system, further cause the memory system to:

store, prior to the second parity information being written to the one or more memory arrays, the second parity information in the one or more data latches in response to calculating the second parity information.

23. A method for memory operations at a memory system, comprising:

initiating a first write operation of a first plurality of pages of data to a first word-line group associated with respective memory arrays of one or more memory dies according to a first write mode, wherein the one or more memory dies comprise a plurality of sets of data latches, and wherein each set of data latches of the plurality of sets of data latches is associated with storing a page of data for access operations associated with the respective memory arrays of the one or more memory dies;

writing the first plurality of pages of data to the first word-line group associated with the one or more memory dies;

storing first parity information for the first plurality of pages of data in one or more data latches of the plurality of sets of data latches in response to writing the first plurality of pages of data;

initiating a second write operation of a second plurality of pages of data to a second word-line group associated with the one or more memory dies according to the first write mode;

retrieving the first parity information from the one or more data latches in response to initiating the second write operation;

writing the second plurality of pages of data to the second word-line group associated with the one or more memory dies; and writing second parity information for the second plurality of pages of data to one or more memory arrays of the one or more memory dies, the second parity information calculated in accordance with the retrieved first parity information and the second plurality of pages of data.

* * * * *